Figure 1:
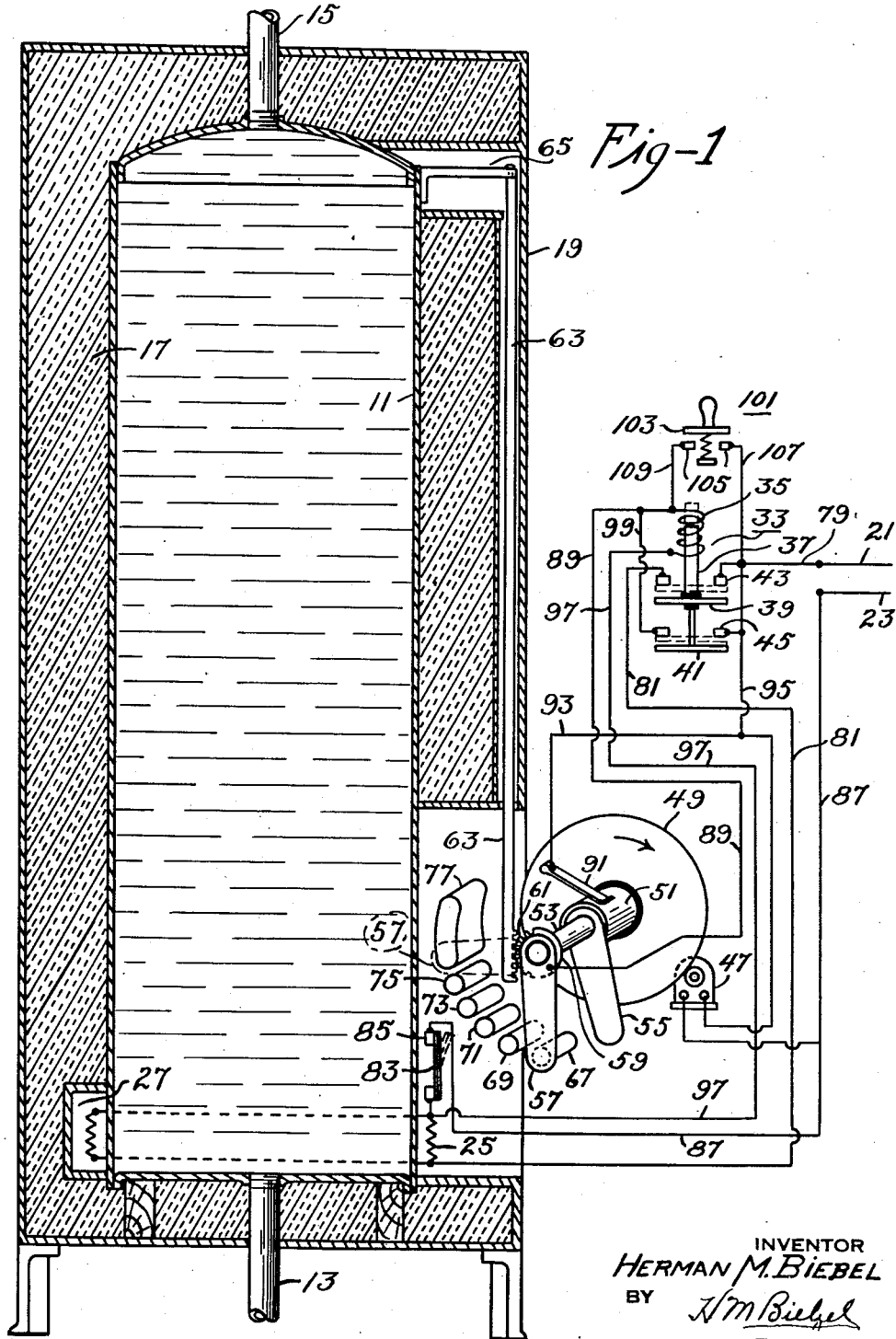

Dec. 16, 1941.　　　H. M. BIEBEL　　　2,266,147
OFF-PEAK WATER HEATING SYSTEM
Filed March 14, 1941　　　2 Sheets-Sheet 1

INVENTOR
HERMAN M. BIEBEL
BY
H. M. Biebel
ATTORNEY

Dec. 16, 1941.  H. M. BIEBEL  2,266,147
OFF-PEAK WATER HEATING SYSTEM
Filed March 14, 1941   2 Sheets-Sheet 2

INVENTOR
HERMAN M. BIEBEL
BY
H. M. Biebel
ATTORNEY

Patented Dec. 16, 1941

2,266,147

UNITED STATES PATENT OFFICE 2,266,147

OFF-PEAK WATER HEATING SYSTEM

Herman M. Biebel, Elgin, Ill., assignor to McGraw Electric Company, Elgin, Ill., a corporation of Delaware Application March 14, 1941, Serial No. 383,296

9 Claims. (Cl. 219—39)

My invention relates to hot water heating systems and particularly to off-peak water heating systems.

An object of my invention is to provide a water heating system including a contact moved in accordance with time and another contact moved in accordance with the heat condition of the tank to cause energization of the electric heater at a time during an off-peak period determined by the heat condition of the tank.

Another object of my invention is to provide a system including two cooperating movable contacts whose paths of movement coincide operatively over a part of the path of one of said contacts.

Another object of my invention is to provide a water heating system including a timer controlled contact subjected to continued movement and a temperature controlled contact movable through a limited coincident path in accordance with the heat content of the tank.

Other objects of my invention will either be apparent from a description of a system now preferred by me or will be pointed out hereinafter in the course of such description and will be set forth in the appended claims.

Figure 2:
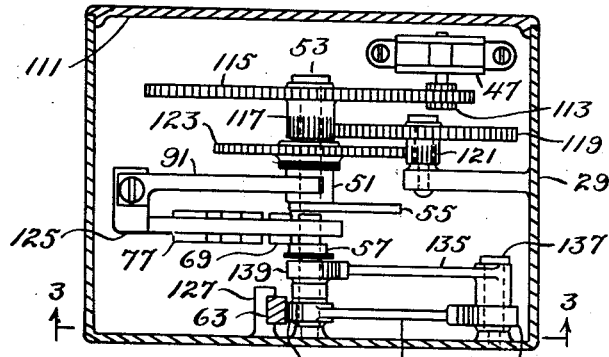
Figure 3:
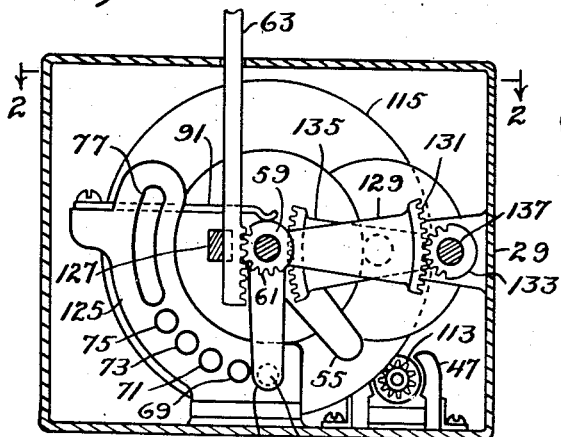
Figure 4:
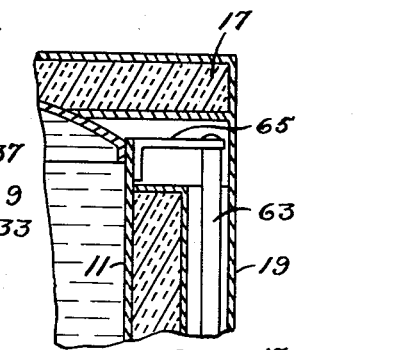
Figure 5:
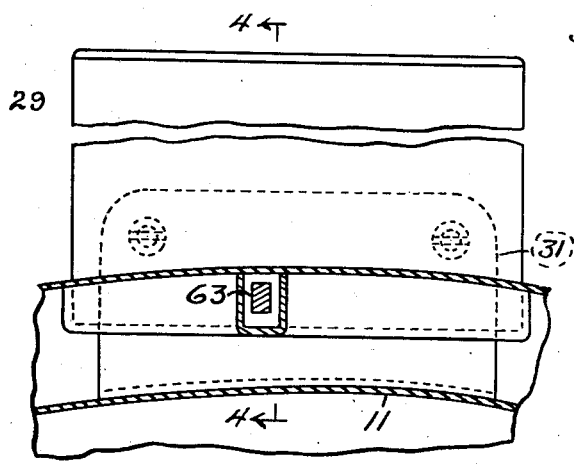

In the drawings:

Figure 1 is a sectional plan view through a domestic hot water tank having associated therewith a control system embodying my invention, the parts being shown generally only, Fig. 2 is a sectional plan view through a casing forming a part of my invention, taken on the line 2—2 of Fig. 3, Fig. 3 is a sectional view taken on the line 3—3 of Fig. 2, Fig. 4 is a fragmentary vertical sectional view on the line 4—4 of Fig. 5, and, Fig. 5 is a horizontal sectional view taken on the line 5—5 of Fig. 4 of the drawings.

I have elected to show my improved water heating control system as associated with an ordinary hot water tank 11 which is shown as of the usual elongated cylindrical domestic type. The tank 11 has associated therewith a lower cold water inlet pipe 13 and an upper hot water outlet pipe 15, all in a manner well known in the art. I may provide heat insulating material 17 around the tank and protect the same by an outer cover 19, also all in a manner well known in the art.

Referring first to Fig. 1 of the drawings wherein I have illustrated the diagram of connections and certain parts of time and temperature controlled elements generally only, a pair of supply circuit conductors 21 and 23 are shown to supply the current for energizing an electric heater 25. I have shown this heater as located against the outside of the tank and in an annular tunnel member 27 although I do not desire to be limited thereto and have shown this for illustrative purposes only. I provide a small casing 29 which is adapted to be supported by a bracket 31 (see Fig. 4) adjacent to the lower end of the tank 11, for containing certain parts of my invention.

Energization of the heater 25 is controlled by an electromagnetic switch 33 including a coil 35 and a magnetizable core member 37 movable in the coil 35. A pair of contact bridging members 39 and 41 are carried by the core 37 and are adapted to engage respectively with pairs of fixed contact members 43 and 45, all in a manner well known in the art.

Means for causing energization of the coil 35 at a predetermined time at the beginning of or a time after the start of an off-peak period includes an electric motor 47 which is adapted to drive a disc 49 which is insulatedly mounted on a metallic bushing or sleeve 51 which, in turn, is insulatedly supported on a shaft 53, being fixed on the shaft to rotate therewith. A contact or arm 55 is fixedly secured to the sleeve or bushing 51 to rotate therewith and it is to be understood that the disc 49 will move through one complete turn in twenty-four hours. It is, therefore, evident that the outer end of the contact or contact arm 55 will move in a given path which is traversed by it once every twenty-four hours.

I provide further a temperature controlled contact or, in the form shown in the drawings, a contact arm 57 which is secured to a pinion 59 insulatedly and movably mounted on shaft 53. Member 59 may either be a pinion or it may be a disc, of small pinion size, having only a portion of its periphery provided with teeth 61. These teeth 61 are adapted to be engaged continuously with the lower end of a non-expansion rod or bar 63, the upper end of which is suitably supported by a bracket 65 which in turn is secured rigidly in any suitable manner against the upper end of the tank, as shown in Fig. 1. The rod 63 may extend downwardly close to the inner surface of the outer cover 19 in order that it will not be subjected to the temperature of the tank 11 when the same is filled with hot water. I may mention that rod 63 is preferably made of Invar steel which has a very low coefficient of expansion with rise of temperature. While I have shown a non-expansible member, my invention is not limited thereto since I may use a metal rod, of aluminum for instance, which has a high coefficient of expansion, suitable changes being made in the rest of the mechanism to obtain the same results as are obtained by the use of a non-expansible metal rod.

I provide a plurality of spaced fixed contact members 67, 69, 71, 73 and 75 located in an arcuate path, each of these contacts being of relatively small peripheral area as well as a final contact 77 of larger peripheral extent. These fixed contact members are located in such position as to be engaged sequentialy by the outer end of contact arm 55 and selectively by the outer end of contact arm 57 for a purpose to be hereinafter described.

Supply circuit conductor 21 is connected by a conductor 79 with one of the fixed contact members 43, the other fixed contact member 43 being connected by a conductor 81 with one terminal of the heater 25. The other terminal of the heater is connected to the fixed end of a bimetal bar 83 forming a part of a main thermally actuable heater control switch, including in addition to the bimetal bar 83, a fixed contact member 85. This thermal switch is shown schematically only and is to be understood as being in heat receiving engagement with the lower portion of the tank or of the water in the lower portion of the tank so that the bimetal bar 83 will be in the position shown by the full lines when the temperature of the water in the lower portion of the tank is below a given value and will be in the position shown by the broken lines when the temperature of the water in the lower portion of the tank is above said temperature or, expresed generally, when the water is cold and when it is hot. Contact member 85 is connected by a conductor 87 with the other supply circuit conductor 23. One end of coil 35 of contactor 33 is connected by a conductor 89 with the contact arm 57. Contact arm 55 is connected through a brush 91 engaging sleeve 51 and conductors 93 and 95 with one of the fixed contact members 45 and 43 and with supply circuit conductor 21. The other terminal of coil 35 is connected by a conductor 97 with the fixed end of bimetal bar 83 and therefore with one of the terminals of heater 25. The motor 47 is connected by suitable conductors with conductor 87 and therefore with supply circuit conductor 23 and with conductor 95 and therefore with the other supply circuit conductor 21.

The other fixed contact member 45 is connected by a conductor 99 with that end of coil 35 to which conductor 89 is connected.

It may be here pointed out that the position of contact arm 55, which is moved continuously by the timer including the motor 47 and the disc 49, as well as other parts to be hereinafter described, is shown in the position which it will occupy a short time before the start of an off-peak period. In other words, the off-peak period may be considered to start at the time that contact arm 55 engages contact 67. The temperature controlled contact arm 57 is shown in the position it will occupy when the tank 11 is filled either entirely with cold water or is filled with cold water to such an extent that it is desirable to energize the heater 25 substantially at the start of an off-peak period.

When contact arm 55, moved in accordance with time, engages one end of the fixedly supported contact 67, and if contact arm 57, moved in accordance with the heat content of the tank, is in a position to engage the other end of contact 67, an energizing circuit through coil 35 will be established substantially as follows: From supply circuit conductor 21, through conductors 79, 95 and 93, through brush 91, bushing 51, contact arm 55, contact member 67 and through contact arm 57 and conductor 89 to coil 35 and from there through conductor 97 to the bimetal bar 83 and through the contact member 85 engaged thereby in case the lower part of the tank is filled with cold water and from there through conductor 87 to the other supply circuit conductor 23. The energized coil 35 will cause magnetization of core 37 and upward movement of the contact bridging members 39 and 41 into engagement respectively with the fixed contact members 43 and 45. Engagement of contact bridging member 39 with the fixed contact members 43 wil establish an energizing circuit through the heater 25 substantially as follows: From supply circuit conductor 21 through conductor 79, through engaged contacts 43 and 39, through conductor 81, through the heater 25, through the bi-metal bar 83 and the engaged contact member 85 and from there through conductor 87 to the other supply circuit conductor 23. This will therefore result in energization of the heater at substantially the start of the off-peak period.

A holding circuit is established by means of the lower contact bridging member 41 substantially as follows, when the upper contact bridging member 39 has been moved into the position shown in broken lines where it is in engagement with the fixed contact members 43. This holding circuit is substantially as follows: From supply circuit conductor 21 through conductors 79 and 95, through the engaged contact members 45 and 41, through conductor 99, coil 35, and through conductor 97, bimetal bar 83 and the engaged contact member 85 and from there through conductor 87 to the supply circuit conductor 23. This holding circuit will therefore be effective to maintain the contact bridging member 39 in engagement with the fixed contact members 43 until certain operative conditions of the system occur, more particularly the flexing of bimetal bar 83 out of engagement with fixed contact member 85 when substantially all of the water in the tank is hot. It may be here pointed out that the termination of the energization of heater 25 once it has been established, as just above described, is dependent only upon the operation of the temperature controlled switch including the bimetal bar 83.

Let it now be assumed that the tank contained an appreciable amount of hot water with the result that the length of the tank is somewhat greater than would be the case if entirely filled with cold water or with a sufficient amount of cold water to cause the temperature responsive rod 63 and tank 11 to move contact arm 57 into engagement with contact member 67. Let it be assumed that the amount of hot water in the tank is sufficient to cause arm 57 to move into engagement with contact member 69. It is therefore evident that there will be a delay in the energization of the heater 25 after the start of the off-peak period since operative electrical engagement between the contacts or the contact arms 55 and 57 will not be established until arm 55 is also in engagement with fixed contact 69. The same comments will apply if the tank contains a larger amount of hot water with the resultant movement of arm 57 into engagement with contact 71 or 73 or 75. If the start of an off-peak period is set for, say, 10 p. m., the design, construction and adjustment of the temperature controlled parts of my device may be such that the arm 55 engages contact 67 at 10 p. m., that it engages contact 69 at 11 p. m., contact 71 at 12 p. m., contact 73 at 1 a. m. and contact 75 at 2 a. m. It is to be understood that the design, construction and adjustment of the parts are such that substantially all of the water in the tank will have been heated to a predetermined temperature before the end of an off-peak period so that the energization of the heater 25 will occur during the maximum valley or dip of the load curve of the power plant.

The relatively elongated contact member 77 is provided in order to make sure that even though the amount of hot water in the tank 11 is relatively large, with resultant movement of arm 57 to the position shown in broken lines in Fig. 1 of the drawings where it engages contact member 77, the heater 25 will still be energized during an off-peak period. The operation of the thermal heater control switch including the bimetal bar 83 will, of course, be effective to deenergize the heater 25 as soon as substantially all of the water in the tank is hot so that the device and parts shown generally in Fig. 1 of the drawings will be effective to energize the heater of a hot water tank either at the start of an off-peak period or at a time thereafter, depending on the amount of hot water in the tank, which will ensure that substantially all of the water in the tank will be hot shortly before the end of an off-peak period.

I am aware of other off-peak heating systems which utilize either one or a plurality of auxiliary thermally actuable switches responsive to the temperature of the water at different points or heights of a tank but in my present invention I use thermal means effective to either integrate the temperature condition of the contents of the tank or to average the temperatures existing in the fluid contents in the tank or, stated in other words, to determine the heat condition or the heat content of the tank to determine when energization of the heater should begin.

While I have hereinbefore referred to my improved water heating system as an off-peak system, it is, of course, possible that, because of unexpected conditions during the on-peak period, that is, the time from say 6 a. m. to 10 p. m., the tank may contain only a small amount of hot water not sufficient for ordinary uses or requirements and in order to be able to energize the heater 25 during on-peak periods, I provide push button switch 101 comprising a contact bridging member 103 normally yieldingly biased out of engagement with fixed contact members 105. One of the contact members 105 is connected by a conductor 107 with supply circuit conductor 21 while the other contact member 105 is connected by a conductor 109 with that end of coil 35 having connected therewith conductors 89 and 99.

It is evident that when contact bridging member 103 is moved into engagement with fixed contact members 105, an energizing circuit through coil 35 will be established as follows: From supply circuit conductor 21 through conductors 79 and 107, through engaged contact members 103 and 105, through conductor 109 and coil 35, through conductor 97, through bimetal bar 83 and contact 85 and from there through conductor 87 to the other supply circuit conductor 23 whereby the hereinbefore described energization of coil 35 will be established, as well as the holding circuit hereinbefore described.

The energization of heater 25 will be continued until, as hereinbefore described, bimetal bar 83 flexes out of engagement with contact 85 to deenergize the heater. It is to be understood that this control of my improved heating system is for emergency purposes but since such emergency conditions may occur, I believe that this operation by an operator of momentarily closing the switch 101 is of value insofar as general use of my improved system is concerned.

Referring now to Figs. 2 to 5 inclusive of the drawings, I have there shown in greater detail a mechanism shown generally only in Fig. 1 of the drawings for obtaining the results above set forth. The casing 29 may be provided with a cover member 111 and is adapted to suitably support the electric motor 47 which is shown in Figs. 2 and 3 of the drawings as provided with a driving pinion 113 adapted to mesh with a gear wheel 115 which is unitary with a small pinion 117. Pinion 117 is adapted to engage with a gear wheel 119 which is integral with a pinion 121 adapted to engage a gear wheel 123 which may or may not be that part represented by member 49 in Fig. 1 of the drawings. However, gear wheel 123 is structurally associated with sleeve 51 and with arm 55 hereinbefore described as being operated in accordance with time. As was stated hereinbefore, 55 is adapted to make one complete revolution in twenty-four hours. The contact members 67, 69, 71, 73, 75 and 77 are adapted to be supported by a sheet 125 of electric-insulating material, these contact members being embedded in the bar or plate 125 with their outer surfaces either flush therewith or, as shown in Fig. 2 of the drawings, extending slightly therebeyond to be engaged, at one end, with arm 55, while the other end thereof is engaged by contact arm 57. Member 125 is suitably supported by one wall of casing 29 as shown generally in Fig. 3 of the drawings.

The rod 63 hereinbefore described as being in mesh with the pinion or part-pinion 61 may be held in close engagement therewith by a bearing 127 which may be supported by one of the walls of the casing 29. The pinion 59 has fixedly engaged therewith an arm 129 having an arcuate toothed outer end 131 which meshes with a pinion 133 integral with an arm 135 and mounted on a suitable shaft 137 and supported by the casing 29. The arm 135 has an outer arcuate surface provided with teeth adapted to mesh with a pinion 139 which is operatively fixedly connected with the thermally actuable contact arm 57 hereinbefore described. The amount of relative movement of the free end of rod 63 and the lower end portion of the tank 11 and particularly of the casing 29, is of course, relatively small and I have shown one structure whereby the amount of turning or angular movement of contact 57 may be made enough so that the desired result will be obtained.

I have not shown any means for varying the longitudinal position of rod 63 relatively to its support 65 as by means of a lever arm and screw threads in the upper end of the arm 63 and in the bracket 65 but this is only one of the methods which I may provide to permit of suitable longitudinal adjustment of the rod 63 and since the particular form of adjusting means forms no part of my invention, I have not thought it necessary to describe the same in detail.

The system embodying my invention thus provides a relatively simple off-peak water heating system controlled by the relative operative positions of a timer controlled contact and a temperature controlled contact, the latter being responsive to the heat condition or the heat content of the tank to ensure energization of an electric tank heater either at the start of an off-peak period or after a predetermined length of delay after such start, to cause deenergization of the heater at least a short time before the end of an off-peak period when the tank is substantially full of hot water. It may be further pointed out that the system embodying my invention is effective to continue energization of the heater beyond the end of an off-peak period in case that all of the water in the tank was not hot at the end of an off-peak period and further, that the user of a system of this kind can energize the heater at any time of the on-peak period should emergency conditions call for such operation.

While I have illustrated and described certain forms of systems embodying my invention, it is obvious that further modifications may be made without departing from the spirit and scope thereof and all such modifications clearly coming within the scope of the appended claims are to be considered as being covered thereby.

I claim as my invention:

1. An off-peak water heating system for a hot water tank having an electric heater, comprising an electromagnetic heater control switch, a first contact member, a continuously operating timer adapted to move said contact member continuously at a constant speed in one direction in a given path, a second contact member, thermostatic means responsive to tank water temperature for positioning said second contact member to be operatively engaged by said first contact member and then disengaged therefrom during the continuous movement of said first contact member to cause circuit closing movement of said electromagnetic switch and energization of said heater and a thermal switch subject to tank water temperature at the lower end of a tank for causing deenergization of said heater only when substantially all of the water in the tank is hot.

2. An off-peak water heating system for a hot water tank having an electric heater comprising an electromagnetic switch for said heater, an electric circuit including the coil of said electromagnetic switch, a pair of relatively movable contact members in said electric circuit adapted to be moved into operative electrical engagement with each other to effect energization and closure of said electromagnetic switch, a continuously operative timer for continuously rotating one of said contact members at a constant speed in a given direction, a thermostatic means responsive to tank water temperature for positioning the other of said contact members to cause said operative engagement between the contact members to occur with a shorter time delay after start of an off-peak period in case the tank contains a predetermined quantity of cold water than if the tank contains less than said predetermined quantity of cold water and a thermal switch subject to tank water temperature near the lower end of the tank and effective to cause deenergization of said coil circuit and of the electric heater only when substantially all of the water in the tank is hot.

3. An off-peak water heating system for a hot water tank having an electric heater, comprising a continuously operating timer, a contact arm caused to rotate continuously at a constant speed by said timer through a circular path, a plurality of peripherally spaced contact members sequentially engageable by said contact arm beginning at substantially the start of an off-peak period, a thermostatic device responsive to the average tank water temperature, a second contact arm movable by said thermostatic device into engagement with one of said contact members in accordance with the average tank water temperature, an electromagnetic heater control switch, electric connections between said switch and said contact arms to cause engagement of one of said contact members by the two contact arms at the same time to effect movement of the switch to heater energizing position, higher average tank water temperature causing the second contact arm to engage a later contact member and a thermal switch subject to tank water temperature near the lower end of the tank and effective to cause deenergization of said electromagnetic switch and of the heater when substantially all of the water in the tank is hot independently of the termination of an off-peak period.

4. A system as set forth in claim 3 and including a manually-closable switch electrically connected in shunt circuit relation to said contact arms, for causing energization of said electromagnetic switch and movement thereof to heater energizing position irrespective of the positions of said contact arms.

5. A system as set forth in claim 3 and including a manually-closable switch electrically connected in shunt circuit relation to said contact arms for causing energization of said electromagnetic switch and movement thereof to heater energizing position irrespective of the positions of said contact arms, and a thermal heater control switch effective to cause deenergization of the heater when substantially all of the water in the tank is hot.

6. An off-peak water heating system for a hot water tank having an electric heater, comprising an electromagnetic heater control switch, a continuously operative timer, a contact member mechanically rotated by said timer at a constant speed in a given direction in a circular path, a thermostatic means responsive to tank water temperature and responsive to the average temperature of the water in the tank, a second contact member movable by said thermostatic means into operative electrical engagement with said first contact member at a time after the start of an off-peak period increasing with increase in the average temperature of the water, electric connections between the electromagnetic switch and the two contact members to cause said operative electrical engagement of the two contact members to effect closure of said electromagnetic heater control switch and energization of said heater and a thermal heater control switch for causing deenergization of the heater when all of the water in the tank has been heated to a predetermined high temperature irrespective of the termination of an off-peak period.

7. An off-peak water heating system for a hot water tank having a single electric heater and subject to withdrawals of hot water therefrom at any time during a twenty-four hour day comprising means for selectively starting energization of said heater at the beginning of an off-peak period or after a delay period, the length of said delay period increasing with increase in the average tank water temperature, said means including an electromagnetic heater control switch, a continuously operative timer, a contact member rotated continuously at a constant speed by said timer in a circular path, thermostatic means responsive to tank water temperature and indicating the average temperature of the water in the tank, a second contact member selectively movable by said thermostatic means into operative electrical engagement with said first contact member at the beginning of an off-peak period or after a delay period, electric connections between the electromagnetic switch and the two contact members to cause said operative electrical engagement of the two contact members to effect closure of said electromagnetic switch and energization of the heater and a thermal switch responsive to tank water temperature near the lower end of the tank selectively effective to cause deenergization of the heater when substantially all of the water in the tank is hot and to cause energization of the heater to continue beyond the end of the off-peak period in case less than substantially all of the water in the tank is hot at the end of an off-peak period.

8. An off-peak water heating system for a hot water tank having an electric heater and subject to withdrawals of hot water therefrom at any time during a twenty-four hour day comprising an electromagnetic heater control switch, a continuously operative timer, a contact member mechanically rotated continuously in a given direction and at a constant speed by said timer in a circular path, a second contact member, thermal means subject to tank water temperature for causing movement of said second contact member, a second thermal means subject to tank water temperature controlling the energization of said electromagnetic switch and electric connections between said heater, said electromagnetic switch, said contact members and said second thermal means to selectively cause energization of said heater after a length of time after the start of an off-peak period which length decreases in proportion to the amount of cold water in the tank at the start of an off-peak period, to cause deenergization of said heater before the end of an off-peak period in case substantially all of the water in the tank is hot before the end of an off-peak period and to cause energization of said heater to continue beyond the end of an off-peak period if less than substantially all of the water in the tank is hot at the end of an off-peak period.

9. A system as set forth in claim 7 and including a normally open switch electrically connected in shunt circuit relation to said contact members, momentary closure of said switch during an on-peak period causing energization of said electromagnetic switch and movement thereof to heater energizing position irrespective of the positions of said contact members, the energization of the heater continuing until substantially all of the water in the tank is hot.

HERMAN M. BIEBEL.